United States Patent Office 3,405,159
Patented Oct. 8, 1968

3,405,159
PROCESS FOR RESOLVING RACEMIC MIXTURES OF OPTICALLY-ACTIVE ENANTIOMORPHS
Kenneth H. Krieger, Chatham, James Lago, Murray Hill, and Joseph A. Wantuck, Woodbridge, N.J., assignors to Merck & Co., Inc., Rahway, N.J., a corporation of New Jersey
No Drawing. Filed Nov. 17, 1964, Ser. No. 411,704
10 Claims. (Cl. 260—465)

ABSTRACT OF THE DISCLOSURE

A process is described for the resolution of racemic mixtures by direct preferential crystallization of one enantiomorph from a supersaturated solution of racemic mixtures of D- and L-enantiomorphs by contacting the supersaturated solution with one of the enantiomorphs in solid crystalline form to preferentially crystallize this enantiomorph and separating this enantiomorph followed by the addition to the remaining solution more racemic mixture which dissolves the enantiomorph and leaves the other optical antipode undissolved which is separated from the solution. The solution is supersaturated and the process is repeated.

This invention relates to an improved process for the resolution of racemic mixtures of optically-active enantiomorphs. More specifically, this invention relates to an improved method of isolating optical antipodes from racemic mixtures thereof by a process involving the direct crystallization of one enantiomorph from a supersaturated solution of the racemic mixture. More specifically also, this invention relates to a method for isolating the optical antipodes included as constituents of a racemic mixture employing only a single solution zone and a single crystallization zone. More specifically also, this invention relates to a resolution process employing the novel step of selectively dissolving only one enantiomorph from a racemic mixture of enantiomorphs, leaving the optical antipode as substantially pure undissolved solid. Still more specifically, it relates to a continuous method of carrying out such resolutions in a process involving only two steps, i.e., a solution step and a crystallization step.

In such a continuous process, according to our invention, a saturated solution of a racemic mixture of enantiomorphs is prepared in a solution zone and then transferred to a crystallization zone where the solution is rendered supersaturated, preferably by reducing the temperature thereof. The saturated solution is then seeded with crystals of the desired enantiomorph to effect selective crystallization of that enantiomorph from solution in substantially pure form and the crystallized enantiomorph is then recovered, e.g. by filtration, from the mother liquors. The mother liquors are supersaturated with respect to the undesired isomer and at least saturated with respect to the crystallized enantiomorph. The mother liquors are then removed to a dissolving zone and the temperature is elevated to the temperature of the original solution. The resulting solution is then contacted with additional solid racemic mixture to selectively dissolve one enantiomorph, leaving the other enantiomorph undissolved in substantially pure form, thus continuously effecting the removal of one of the enantiomorphs constituting the racemic mixture in a solution zone and the other enantiomorph in a crystallization zone, said enantiomorphs being removed from the crystallization or solution zones in a continuous or an intermittent fashion as they are formed.

One important application of our invention is in the resolution of a racemic mixture of D- and L-acylamino nitriles, i.e., α-acetylamino-α-vanillyl (veratryl or dihydroxybenzyl)propionitrile, an intermediate in the preparation of L-α-methyl-3,4-dihydroxyphenylalanine (α-methyldopa), a potent antihypertensive agent in man. This intermediate is readily converted to α-methyldopa by the two-step hydrolysis of the resolved L-acylamino nitrile to the corresponding L-α-aminopropionamide, then to the corresponding L-α-aminopropionic acid and, in the case of vanillyl or veratryl compounds, conversion of the ring methoxyls to the corresponding hydroxyls.

In the synthesis of the potent α-methyldopa it is important that a resolution of isomers be carried out at some stage of the process since only the L form of the product is active in man. The synthesis of the product may be accomplished using optically-inactive intermediates to prepare racemic α-methyldopa but in this case the final product must be resolved to obtain pure L form, resulting in a 50% loss at the last stage of the process. This is true since the final product cannot be completely racemized by any of the known methods of racemization without destroying the compound. The importance of the acyl-amino nitrile intermediate resides in the fact that the compounds may be easily resolved by the selective crystallization of the desired enantiomorph from a solution of the racemic mixture and, in addition, the unwanted isomer is easily converted into a racemic mixture of the two enantiomorphs by well-known methods of racemization, i.e., by treatment of the D-isomer with a small amount of a base such as sodium cyanide in dimethylsulfoxide solution. The resolution at the acylamino nitrile stage thus permits maximum utilization of intermediates and consequent improved efficiency in the production of the important hypertensive agent.

Our process is important in that it is generally useful in the resolution of racemic mixtures of enantiomorphs. In the case of compounds which exhibit optical isomerization, invariably only one isomeric form of a product is biologically useful. When such compounds are prepared by chemical syntheses or partial chemical syntheses, the product generally obtained is a racemic modification which must be separated into its component enantiomorphs. Examples of this are quite common in the industrial production of a variety of amino acids and amino acid derivatives, as well as in the chemical syntheses of certain antibiotics such as Chloramphenicol.

In previous methods of resolution of racemic mixtures by the technique of selective crystallization, it was believed necessary to first prepare a super-saturated solution of the racemic mixture and to subsequently inoculate the supersaturated solution with a quantity of one of the crystalline enantiomorphs. Following separation of seed and the crystallized enantiomorph and filtration from solution, it was then believed necessary to reduce the concentration of the optical antipode by seeding in the same manner in order to achieve complete resolution. Following the two crystallizations, the mother liquors were returned to the process and again supersaturated with the racemic mixture. In such a crystallization method it was believed important to carefully balance the amount of each enantiomorph removed from solution so that the final mother liquors would be optically inactive, i.e., contain equal amounts of both isomers. To achieve this balance, it is necessary to carefully control the amount of crystalline seed and the particle size of the seed, since the rate and the total amount of crystallization from the solution are each dependent on the total surface area of crystals available and the time said crystals are in contact with the supersaturated solution. In view of the possibility of contamination of either of the crystallizers through spontaneous nucleation and consequent crystallization of the two enantiomorphs simultaneously, it is desirable to reduce this possibility of contamination to a minimum.

In accordance with the present invention, a supersaturated solution of a racemic mixture is introduced into a crystallization vessel and the solution is then contacted with crystals of the desired isomer to effect preferential crystallization of the isomer and thus relieve the supersaturation of the solution relative to that particular isomer. The crystalline material prepared in this manner is separated from the solution, which remains supersaturated with respect to the unwanted isomer and merely at least saturated with respect to the desired isomer. The solution is removed to a dissolving zone and the temperature is raised, and it is then contacted with sufficient solid racemic mixture to fully saturate the solution (approximately twice the amount by weight of material crystallized and removed from solution in the crystallization zone). In this step the wanted isomer is selectively dissolved from the racemic mixture and the unwanted isomer remains in the dissolving zone as an undissolved solid phase which may be withdrawn intermittently or continuously from the dissolving zone. The separation of both D and L enantiomorphs from an racemic mixture thereof is thus accomplished using only a single crystallizer for production of the desired isomer and a single dissolver for removal of the undesired isomer. Where unwanted isomer is accumulated, this unwanted isomer may be withdrawn and racemized by known methods and the racemized product subsequently used as raw material for the resolution process.

The present invention is based on the principle that a solution which is saturated with respect to one of the enantiomorphs of a racemic mixture and less than saturated with respect to the optical antipode thereof will selectively dissolve only the said optical antipode when contacted with sufficient solid racemic mixture to saturate the solution with regard to said antipode. Thus, if the amount of solid racemic mixture added is just sufficient to saturate the solution relative to said antipode its enantiomorph will remain as undissolved solid, achieving a novel separation of enantiomorphs by selectively dissolving only one enantiomorph from a racemic mixture.

It is known that compounds which exhibit optical isomerism may exist in any one of several racemic modifications. One of these modifications is known as a racemic mixture. This modification is a mechanical mixture of individual crystals of the D and L forms of the compound. Another of these modifications is a racemic compound. This modification results when a pair of enantiomorphs unite to form a racemic compound in which case the crystals of the racemic mixture contain equal amounts of both isomers and are identical. The physical properties of these racemic compounds are markedly different from the physical properties of either of the constituent enantiomorphs. Still another racemic modification is the racemic solid solution. This particular modification differs from a racemic mixture in that it contains only a single phase, as does a racemic compound. It may be distinguished from a racemic compound, on the other hand, since all mixtures composed of the racemic solid solution and either enantiomorph will act as a single phase, whereas any mixture composed of a racemic compound and either enantiomorph comprises two phases.

The process of our invention is limited to the resolution of the racemic modification identified as a racemic mixture and may not be employed in separating either racemic compounds or racemic solid solutions into their component enantiomorphs. In determining whether or not any particular racemic modification may be resolved in accordance with the present process, the following simple freezing point determination is employed. The freezing point of the racemic modifications to be dissolved is first determined by conventional techniques, then a small amount of either the pure D or L enantiomorph form is added to the racemic modification and the freezing point again determined. If the freezing point of the racemic modification is raised by the addition of pure enantiomorph, the particular modification is a racemic mixture which may be resolved by the process of the present invention. If, on the other hand, the freezing point of the racemic modification is lowered, the modification is known to be a racemic compound; or if it remains the same, the modification is known to be a racemic solid solution and in neither of these cases may the modification be resolved by the process of the present invention.

One further important criterion in determining whether a particular racemic mixture may be resolved in accordance with our process is the solubility characteristic of the recemic mixture relative to the solubility of either enantiomorph. In order for a racemic mixture to be resolved in accordance with our process, the racemic mixture must have a greater solubility in the selected solvent than either of the component enantiomorphs alone.

Racemic mixtures may also be distinguished from racemic compounds of X-ray analysis. In the case of a racemic mixture the X-ray diffraction patterns of the racemate and of either of the enantiomorphs are indistinguishable but in the case of a racemic compound the X-ray diffraction pattern of the racemate shows marked differences from the X-ray diffraction pattern of either of the enantiomorphs.

Our improved resolution process is effective for the resolution of racemic mixtures of optically active organic compounds, the only requirements being that the racemic modification of the compound be a racemic mixture of the enantiomorphs at the temperature of the resolution and that the solubility of the mixture be greater than either of the component enantiomorphs. The process is applicable to a variety of racemic mixtures of optically-active organic compounds, such as DL-3-(3,4-dihydroxyphenyl)alanine, N - benzoyldichloroamphetamine, DL-threo-1-(p-nitrophenyl)-2-aminopropane-1,3-diol, the racemic mixture of DL-sodium ammonium tartrate, the racemic mixture of the zinc ammonium salts of lactic acid, DL-atropine sulfate, the DL form of dilactyldiamide and DL histidine monohydrochloride. It is important in the application of the present process to the resolution of racemic mixtures of such compounds that the transition temperatures at which the racemic mixture is converted into a racemic compound be known. Thus, the resolution of sodium ammonium tartrate must be carried out at temperatures below 27° C., the transition temperature for the conversion of the racemate from a racemic mixture to a racemic compound. In similar manner, the resolution of dilactyldiamide must be carried out at temperatures above 35° C. since below this temperature the racemate is in the form of a racemic compound.

In accordance with one embodiment of our invention, a saturated solution of α-acetylamino-α-vanillyl propionitrile in water is prepared at 35° C. The solution is then introduced into a crystallizing vessel, the temperature lowered approximately 7° and crystalline L-α-acetylamino-α-vanillyl propionitrile introduced into the crystallization vessel to effect crystallization of the desired L isomer. The crystalline material is then separated from solution and the solution, depleted with respect to the L isomer, returned to the dissolving vessel and the temperature of the solution readjusted to 35° C. To the solution, with agitation, is then added sufficient L-α-acetylamino-α-vanillyl propionitrile to completely saturate the solution relative to the L isomer, leaving as undissolved solid the corresponding D isomer equal in weight to approximately half the amount of racemic mixture added to the dissolving vessel. The saturated solution is then removed again to the crystallization zone and the process repeated. In this manner an effective separation of the D and L isomers of α-acetylamino-α-vanillyl propionitrile is obtained in a two-stage process involving only a crystallization zone and a solution zone.

The choice of solvent for use in the process of our invention depends upon the solubility characteristics of the racemic mixture to be separated. When practicable for economic reasons, it is preferred to use water or an aqueous solvent although if required by the solubility characteristics of the material to be resolved, a relatively inexpensive organic solvent such as a lower alkanol (methanol, ethanol, isopropanol, and the like) a lower alkyl ketone (acetone, methylethyl ketone, methylisobutyl ketone, and the like) ethers including dioxane, lower aliphatic esters such as methyl, ethyl, propyl, butyl and amyl, esters of acetic, propionic and butyric acids, lower alkyl nitriles such as acetonitrile, propionitrile, and butyronitrile, aromatic hydrocarbons and halogenated aromatic hydrocarbons, or mixtures of these solvents with each other or with water, may be employed.

In accordance with the process of our invention, the supersaturated solution of the racemic mixture may be formed in a number of different ways. One method is to form a saturated solution at an elevated temperature and then to lower the temperature until the solution becomes supersaturated relative to the material being resolved. The temperature differential should not be so great that spontaneous crystallization of the racemic mixture occurs since in that event no resolution is obtained. The temperature differential selected depends on the change in solubility of the mixture with temperature and should be selected so that the solution is supersaturated to the extent of at least 5 grams per liter but no more than about 20 grams per liter.

In one preferred embodiment of our invention, a saturated solution of the racemic mixture is prepared at a temperature in excess of room temperature, i.e., at about 35–40° C. and the temperature then lowered to about 20–30° C. dependent on the change of the solubility of the solute with temperature. In forming the supersaturated solution, the temperature is lowered to a point such that the extent of supersaturation is approximately 5 grams per liter.

The cooled seeded solution, which is either saturated or still somewhat supersaturated in the desired enantiomorph depending on the aging time and still supersaturated with the other enantiomorph, is filtered to give a 30–50% recovery of one of the enantiomorphs at purities ranging from 95–100%. Usage of seed crystals of the desired enantiomorph will vary with the mode of operation. Preferably at least 5 grams of seed per liter of supersaturated solution is added, usually 150 grams per liter or even more. The amount of seed crystals used is a practical matter. The upper limit is a functional of the viscosity of the slurry. The amount of seed to use also depends in part on the particle size since smaller particles have more seeding area per unit weight. The seeding efficiency (i.e., the combination of the amount and the particle size) controls the rate of discharge of the supersaturation. If the amount is low or the particles are large, the rate is slow. Large amounts and small particle size increase the rate of crystallization. The slower the rate the more contamination is possible. As a practical matter, the residence time in the dissolver is generally set equal to that in the crystallizer and a trivial amount of the dissolver isomer in the solid phase is sufficient to maintain balanced saturation in an agitated dissolver.

A second method of forming a supersaturated solution is to maintain the solutions at constant temperature and adjust the pH of the aqueous solution to increase the solubility of the component to be resolved. Thus, if the racemic mixture of the compound is a weakly ionized substance in aqueous solution but readily forms salts in acid or alkaline solution, the material to be resolved may be dissolved in an aqueous solution of the acid or a base, and supersaturation of the solution achieved by partially or completely neutralizing the solution. Thus, in the case of an amine, the racemic mixture is dissolved in an acidic solution to form a saturated or nearly-saturated solution of the amine salt. Supersaturation is then achieved by partially or completely neutralizing the salt employing a water-soluble alkali, thereby freeing some of the amine compound from its salt form. In a similar manner, an aqueous solution of a salt of an organic acid is formed by dissolving an organic acid in an alkaline solution which partially or completely neutralizes the acidic function as the ammonium or the alkali metal salt thereof. Supersaturation is then achieved by partially acidifying the saturated solution of the acid salt, thus converting some of the salt to its less soluble free acid form.

Another method of forming a supersaturated solution is by volatilization of the solvent, either by raising the temperature or by lowering the pressure, from the saturated solution. This method is especially usable when the aqueous solution contains a minor amount of a polar solvent, such as methanol, which is highly volatile.

The preferred method of effecting supersaturation is by forming a saturated solution at one temperature and lowering the temperature to cause supersaturation. This method is especially advantageous since it requires the addition of no contaminating material; there is thus no build-up of extraneous matter in the mother liquor of the crystallization, and the process operates continuously in only two stages.

An especially important advantage of our process is that only one crystallization zone is required and only one solution zone is required. The desired isomer is crystallized in high optical purity in the crystallization vessel and the unwanted isomer remains undissolved in the solution vessel. Heretofore, it was thought necessary in resolving racemic mixtures by direct crystallization to exactly balance the rate of both D and L isomer production in order that the mother liquor would contain a solution of the racemate. In the two crystallizing vessels needed, this required careful control of the temperature and the amount of seed crystal area available for crystalline growth, since the rate of crystallization is dependent upon the seed area available.

In the present method, although it is desirable that the crystalline isomer seed be of uniform small particle size in order that the product is produced at a maximum rate consistent with high optical purity, there is no need to balance the rate of production of D and L isomers so that they are exactly equal. All that is required is that the depleted solution returning from the crystallizing vessel be contacted at an elevated temperature with sufficient racemic mixture to saturate the solution relative to the isomer removed, the other isomer being retained in solution at its saturation point. On adding the solid racemic mixture the isomer which is subsequently crystallized is preferentially dissolved and the optical antipode remains in the solution zone as undissolved solid which is collected and removed to be racemized.

In one method of continuous operation, a supersaturated solution of the racemic mixture is pumped into a crystallizing vessel and crystalline seed having a particle size of approximately 50 microns is added in a concentration of about 200 grams per liter of saturated solution. Crystallization begins immediately and the depleted solution is removed through a baffled escape section at such a rate that the supersaturated solution has a nominal residence time in the crystallizer of about 20 minutes. The depleted solution is then pumped into a discharge tank and the temperature raised from about 5–15° and racemic solid mixture is added, with agitation, to the influent depleted solution in an amount equal to approximately twice the amount of crystalline isomer removed from the solution in the crystallizer (the amount to be added is calculated from the optical rotation of the depleted solution). In order that the solution become fully saturated in the dissolver it is essential that the racemic mixture added be of small particle size and that the solution be vigorously agitated at the elevated temperature of the dissolving vessel. The saturated solution formed in this manner is removed from the dissolver through a filter to remove the undissolved unwanted isomer and any residual crystals of wanted isomer, to avoid any spontaneous crystallization of racemate from the supersaturated solution in the crystallizer. The solid material removed from the dissolving tank in this method of operation is a mixture of the unwanted isomer contaminated with small amounts of wanted isomer. This solid may then be racemized and returned to the dissolver for further resolution.

In an alternate method of operation which results in the production of substantially pure crystalline isomer in the crystallizer and in substantially pure antipode thereof in the dissolver, the dissolving tank is charged with solvent and sufficient racemic mixture to more than saturate the solution at the dissolver temperature. The system is then allowed to operate in the manner described above without the addition of additional racemic mixture. In this method of operation, pure crystalline isomer separates from solution in the crystallizing tank and the desired isomer is dissolved from the excess racemic mixture until all of the racemic mixture is exhausted from the dissolving tank and the rate of crystallization falls to practically zero in the crystallizing tank, at which time the solution circulating in the system is saturated with regard to the isomer being crystallized at the crystallizer temperature and supersaturated with respect to the antipode thereof. The solid material contained in the crystallizer is substantially pure crystalline isomer and the solid contained in the dissolving tank is the pure antipode thereof.

EXAMPLE 1

Continuous resolution of α-acetylamino-α-vanillyl propionitrile

The apparatus consists of two 30-liter vessels which are maintained at constant temperature. The dissolving tank is equipped with internal filters and maintained at a temperature of 35°. The crystallizer consists of a 30-liter tank equipped with an integral settling chamber and a baffled escape section. The solution is pumped from the dissolver through a heat exchanger to raise its temperature to 50° C. and dissolve any nuclei of racemic mixture crystals passing the filter. A second heat exchanger in the line cools the solution to the crystallizing temperature of 28° C. The line returning depleted solution from the crystallizer to the dissolver contains a heat exchanger which raises the temperature of the depleted solution to 35°, the temperature of the dissolver.

A typical run is described. Both dissolver and crystallizer tanks are charged with solutions saturated with racemic mixtures at the temperature of the vessel. The solution consists of approximately 50 grams of the racemic mixture per liter of a solvent mixture made up of 70% isopropanol and 30% water by weight. The solution is then pumped at a rate so that the nominal residence time in the crystallizer is about 20 minutes and circulation in the system is balanced. Seed crystals of L-α-acetylamino-α-vanillyl propionitrile are fed to the agitated zone of the crystallizer in an amount of 200 grams per liter of influent solution. The L-α-acetylamino-α-vanillyl propionitrile crystals produced are recovered in a settling zone and the solution pumped to the crystallizer to be resaturated in the L isomer. A racemic mixture of D and L isomers is added periodically to the dissolver tank with agitation in an amount equivalent to about twice the weight of crystals produced in the crystallizing tank. The solid material produced in each vessel is removed periodically throughout the operation of the process. The operating conditions are listed below.
 (1) Dissolver temperature—35° C.
 (2) Crystallizer temperature—28° C.
 (3) Residence time in crystallizer—20 minutes.
 (4) Crystallizer volumes:
   Total—22 liters.
   Crystallizer zone—15 liters.
 (5) Crystallization rate—5.7 gms./liter-hour.
 (6) Total operating time—55¼ hours.
 (7) L-N-acetyl seed—3000 kgms.; 200 gms./liter.
 (8) L-N-acetyl crystallized—3910 gms.
 (9) Average ΔT—7° C.

EXAMPLE 2

Batch resolution of DL-α-acetylamino-α-vanillyl propionitrile

This experiment is conducted in equipment similar to that described in Example 1 and with the same solvent mixture but on a smaller scale and with the crystallizer set with internal filters instead of a settling chamber. The dissolver (a 3-liter resin kettle) is charged initially with an amount of racemic mixture DL solids commensurate with the expected production in the crystallizer. The crystallizer is charged with small particle size seed affording a large surface area (crystallization rate is dependent on seed area). Pump rates are set for a nominal residence time in the crystallizer of 45 minutes and for balanced circulation in the system. No subsequent additions of DL solids are made, and when the run is terminated, the contents of the dissolver and crystallizer are filtered and the resulting cake dried. The temperature of the dissolver is maintained at about 37° C. and the temperature of the crystallizer is maintained at about 25° C.

PROCESS DATA

| Time | Kettle Temp., ° C. | | Comments |
| --- | --- | --- | --- |
| | Dissolver | Crystallizer | |
| Dec. 23, 1963: | | | |
| 9:30 a.m. | 36.8 | 33–28 | Seeded. |
| 11:30 a.m. | 36.9 | 25.0 | |
| 12:30 p.m. | 37.0 | 25.0 | |
| 1:30 p.m. | 36.9 | 25.0 | |
| 3:30 p.m. | 37.0 | 25.0 | |
| 7:00 p.m. | 37.0 | 25.0 | |
| 8:00 p.m. | 37.0 | 25.0 | |
| 9:30 p.m. | 37.0 | 25.0 | End of Run |

Summary of data:
 (1) Crystallization rate—7.03 gms./liter-hour.
 (2) Residence time—45 minutes.
 (3) ΔT—12° C.
 (4) Material balance—98.7%.
 (5) Total operating time—12 hours.
 (6) Seed level—200 gms./liter.
   Seed size—50 microns.
   Area—5000 sq. cm./gm.
 (7) Rotations—quality:
   Product—100% L.
   Dissolver solids—97.5% D.
 (8) Net product crystallized—157.4 gms.

EXAMPLE 3

Resolution of DL-3-(3,4-dihydroxyphenyl)alanine (DOPA)

DOPA has been characterized as a racemic mixture by X-ray analysis (the powder X-ray patterns of the DL and isomer forms are identical). The DL is approximately twice as soluble as the isomer (8.9 and 4.2 gms./liter in 0.001 N HCl at 25° C.).

Two 4-liter glass resin kettles, set with agitators, baffles, and internal fritted glass tubular filters are interconnected by two pumps each sucking from a set of the internal filters and discharging into the other kettle in such a way that a continuous cycle of filtration can be maintained.

To commence, a solution of 0.3 N hydrochloric acid is saturated with DL–DOPA at 45° C. in the first of the two kettles and additional DL–DOPA provided as a solid phase in that kettle. Filtrate, saturated at 45° C., is pumped from the first kettle into the second kettle; simultaneously additional solvent and solid are added to maintain the "dissolver" volume. The filtrate entering the second kettle ("crystallizer") is cooled to 32° C. and allowed to freely contact L isomer seed. Finally, the circuit is completed by pumping from the "crystallizer" filters back to the "dissolver." By the process of selective crystallization, L isomer crystallizes on the L seed in the "crystallizer" and the return filtrate from the "crystallizer" is depleted in L isomer but still saturated in D isomer, at the dissolver temperature. In the "dissolver," the process of selective solution of L isomer takes place in the presence of DL solids. The total weight of DL solids charged as a solid phase to the dissolver once a solution saturated at 45° C. has been obtained is 800 gms.

After 30 hours of pumping at a rate such that the nominal residence time in each vessel is 1 hour, the contents of the two vessels are filtered individually. There results from the "crystallizer" a production (net, after deducting seed) of 390 gms. of substantially pure L isomer. Similarly, there results from the "dissolver," 410 gms. of solids, which are composed of 400 gms. of D isomer and 10 gms. of L isomer.

EXAMPLE 4

Resolution of N-benzoyl dichloroamphetamine

This compound also forms a racemic mixture, as determined by X-ray analysis. The solubility of the DL is somewhat less than twice as soluble as the isomer in acetone or o-dichlorobenzene.

The apparatus is similar to that described in the example above. In a 20-hour run using o-dichlorobenzene as solvent, the productivity of pure L isomer in the "crystallizer" (net, after deducting seed) is 78 grams. The solid phase remaining behind in the "dissolver" is also 78 grams, and is substantially pure D isomer. A total of 156 grams of DL above that initially in solution is charged to the "dissolver" in the course of the run.

EXAMPLE 5

Resolution of DL-threo-1-(p-nitrophenyl)-2-amino-propane-1,3-diol

This compound also forms a racemic mixture, as determined by X-ray analysis. The solubility of the DL is about twice that of the isomer in isopropanol.

The apparatus is similar to that described in Example 3. The solvent is isopropanol. After 30 hours of operation, 285 grams of substantially purse L isomer is removed from the "crystallizer" and 295 grams of solids containing 290 grams of D isomer are removed from the "dissolver." Throughout the run a temperature differential of 25° C. is maintained between the vessels.

In all examples above the solution exiting from the dissolver exhibits substantially 0° optical rotation, indicating that a rebalancing of optical activity is taking place in the "dissolver."

What is claimed is:

1. A process for resolving a racemic mixture of optically-active enantiomorphs of a compound selected from the group consisting of DL-α-acetylamino-α-vanillyl-propionitrile, DL-3-(3,4-dihydroxyphenyl)alanine, N-benzoyl-dichloroamphetamine, DL-threo-1-(p-nitrophenyl)-2-amino-propane-1,3-diol, DL-sodium ammonium tartrate, DL-zinc ammonium lactate, DL-atropine sulfate, DL-dilactyl-diamide and DL-histidine monohydrochloride which comprises:
   (a) preparing a supersaturated solution of a racemic mixture of said optically active-enantiomorphs;
   (b) contactnig said supersaturated solution with one of said optically-active enantiomorphs in solid crystalline form to effect preferential crystallization of said enantiomorph and consequent depletion of said supersaturated solution relative to said enantiomorph;
   (c) separating the crystalline enantiomorph from said depleted solution;
   (d) removing the depleted solution to a dissolving zone;
   (e) contacting said depleted solution with finely-divided solid racemic mixture to selectively dissolve said enantiomorph from the solid racemic mixture and leave the optical antipode as undissolved solid in said dissolving zone, thereby forming a saturated solution of said racemic mixture;
   (f) separating the resulting saturated solution from the undissolved antipode; and
   (g) treating said saturated solution to achieve supersaturation relative to said racemic mixture.

2. The process according to claim 1 in which the undissolved optical antipode is racemized to form a racemic mixture of the optically-active enantiomorphs and said racemic mixture is returned to the process in Step (e).

3. The process for resolving a racemic mixture of optically active enantiomorphs of a compound selected from a group consisting of DL-α-acetylamino-α-vanillyl-propionitrile, DL-3-(3,4-dihydroxyphenyl)alanine, N-benzoyl-dichloroamphetamine, DL-threo-1-(p-nitrophenyl)-2-amino-propane-1,3-diol, DL-sodium ammonium tartrate, DL-zinc ammonium lactate, DL-atropine sulfate, DL-dilactyldiamide and DL-histidine monohydrochloride which comprises:
   (a) contacting a supersaturated solution of said racemic mixture with one of said optically-active enantiomorphs in finely-divided solid crystalline form to effect preferential crystallization of said enantiomorph and consequent depletion of said supersaturated solution relative to said enantiomorph;
   (b) separating said crystalline enantiomorph from said depleted solution;
   (c) heating and transferring said depleted solution to a dissolving zone;
   (d) adding to said heated depleted solution an amount of said solid racemic mixture equivalent to twice the weight of enantiomorph crystallized from said solution to selectively dissolve said enantiomorph from said solid racemic mixture and leave substantially pure optical antipode as undissolved solid and form a saturated solution of said racemic mixture; and
   (e) cooling the saturated solution of said racemic mixture to achieve supersaturation.

4. The process according to claim 3 wherein the supersaturated solution of the racemic mixture is formed by lowering the temperature at least 5° C. of a saturated solution of the racemic mixture formed between 20–100° C.

5. The process according to claim 3 wherein at least 5 grams of one crystalline enantiomorph having a particle size of from 50 to 200 microns is added to each liter of supersaturated solution of racemic mixture.

6. The process for resolving a racemic mixture of D- and L-α-acetylamino-α-vanillyl propionitrile which comprises:
   (a) contacting a supersaturated solution of a racemic mixture of said D and L propionitrile with approximately 150–200 grams of L-α-acetylamino-α-vanillyl propionitrile in crystalline form having a particle size of from 50 to 100 microns per liter of supersaturated solution to effect preferential crystallization of the L-enantiomorph and consequent depletion of said supersaturated solution relative to said L-enantiomorph;
   (b) separating said depleted solution from said crystalline L-α-acetylamino-α-vanillyl propionitrile;
   (c) raising the temperature of said solution at least 5° while transferring it to a dissolving zone to form a solution saturated in respect to the D-α-acetylamino-α-vanillyl propionitrile and less than saturated relative to the L-enantiomorph;
   (d) contacting said heated solution with just sufficient solid racemic mixture of α-acetylamino-α-vanillyl propionitrile to fully saturate said solution relative to the L-enantiomorph and leave the D-enantiomorph as undissolved solid in said dissolving zone;
   (e) separating said saturated solution from the undissolved solid and cooling said solution at least 5° to prepare a supersaturated solution of the racemic mixture.

7. In a process for resolving a racemic mixture of optically-active enantiomorphs of the compounds selected from the group consisting of DL-α-acetylamino-α-vanillylpropionitrile, DL-3-(3,4 - dihydroxyphenyl)alanine, N-benzoyl-dichloroamphetamine, DL-threo-1-(p-nitrophenyl)-2-amino-propane-1,3-diol, DL - sodium ammonium tartrate, DL-zinc ammonium lactate, DL-atropine sulfate, DL-dilactyldiamide and DL-histidine monohydrochloride by the direct preferential crystallization of one enantiomorph from a supersaturated solution of the racemic mixture of D- and L-enantiomorphs the improvement which comprises contacting a solution saturated with respect to one enantiomorph and less than saturated with respect to the optical antipode thereof with sufficient solid racemic mixture to fully saturate said solution with said optical antipode whereby said optical antipode is selectively dissolved and the enantiomorph thereof remains as undissolved solid, and separating said undissolved solid from solution.

8. In a process for resolving a racemic mixture of D- and L-α-acetylamino-α-vanillyl propionitrile by the direct preferential crystallization of the L-enantiomorph from a supersaturated solution of the racemic mixture of D- and L-enantiomorphs, the improvement which comprises contacting a solution saturated with respect to the D-enantiomorph and less than saturated with respect to the L-enantiomorph with sufficient solid DL-α-acetylamino-α-vanillyl propionitrile to fully saturate said solution with said L-enantiomorph, whereby the L-enantiomorph is selectively dissolved from the racemic mixture and the D-enantiomorph remains as undissolved solid, and separating said solid D-enantiomorph from solution.

9. The process of selectively dissolving the one enantiomorph from a solid racemic mixture of D- and L-enantiomorphs of a compound selected from the group consisting of DL-α-acetylamino-α-vanillyl propionitrile, DL-3-(3,4-dihydroxyphenyl)alanine, N-benzoyl-dichloroamphetamine, DL-threo-1-(p-nitrophenyl)-2-aminopropane-1,3-diol, DL-sodium ammonium tartrate, DL-zinc ammonium lactate, DL-atropine sulfate, DL-dilactyldiamide and DL-histidine monohydrochloride which comprises contacting an optically-active solution of said D- and L-enantiomorphs, said enantiomorphs being dissolved in said solution in unequal amounts with sufficient racemic mixture to fully saturate said solution in both enantiomorphs, whereby the enantiomorph present in the lesser amount is selectively dissolved from said racemic mixture and the antipode thereof remains as undissolved solid.

10. The process of selectively dissolving L-α-acetylamino-α-vanillyl propionitrile from a solid racemic mixture of D- and L-α-acetylamino-α-vanillyl propionitrile which comprises contacting an optically-active solution of said D- and L-enantiomorphs, said solution containing the D-enantiomorph in a greater concentration than the L-enantiomorph, with sufficient solid DL-α-acetylamino-α-vanillyl propionitrile to fully saturate said solution in both enantiomorphs, whereby the L-enantiomorph is selectively dissolved from said DL-propionitrile and the D-enantiomorph remains as undissolved solid.

References Cited
UNITED STATES PATENTS

| | | | |
|---|---|---|---|
| 2,734,919 | 2/1956 | Amiard et al. | 260—570.6 |
| 2,767,213 | 10/1956 | Long | 260—570.6 |

OTHER REFERENCES

Secor, Chem. Rev., vol. 63, pp. 297–309 (1963).

FLOYD D. HIGEL, *Primary Examiner.*